US008843615B2

(12) United States Patent
Candia et al.

(10) Patent No.: US 8,843,615 B2
(45) Date of Patent: Sep. 23, 2014

(54) METHOD AND DEVICE FOR MEASURING THE TEMPORAL DRIFT OF AN ITEM OF ELECTRONIC EQUIPMENT CONNECTED TO A NETWORK

(75) Inventors: Fabrice Candia, Rieux (FR); Patrice Casse, Merville (FR)

(73) Assignee: Airbus Operations S.A.S., Toulouse (FR)

( * ) Notice: Subject to any disclaimer, the term of this patent is extended or adjusted under 35 U.S.C. 154(b) by 461 days.

(21) Appl. No.: 12/865,540

(22) PCT Filed: Dec. 24, 2008

(86) PCT No.: PCT/FR2008/001823
§ 371 (c)(1),
(2), (4) Date: Jul. 30, 2010

(87) PCT Pub. No.: WO2009/103909
PCT Pub. Date: Aug. 27, 2009

(65) Prior Publication Data
US 2011/0022708 A1    Jan. 27, 2011

(30) Foreign Application Priority Data

Jan. 31, 2008 (FR) ...................................... 08 50614

(51) Int. Cl.
*G06F 15/173* (2006.01)
*H04L 12/26* (2006.01)
*H04J 3/06* (2006.01)

(52) U.S. Cl.
CPC ............. *H04J 3/0638* (2013.01); *H04J 3/0664* (2013.01); *H04L 43/106* (2013.01); *H04L 43/12* (2013.01)
USPC ........................... 709/224; 370/503; 370/504

(58) Field of Classification Search
CPC .... H04J 3/0664; H04J 3/0638; H04L 43/106; H04L 43/12
USPC .................................. 709/224; 370/503–504
See application file for complete search history.

(56) References Cited

U.S. PATENT DOCUMENTS

| | | | | |
|---|---|---|---|---|
| 5,600,632 | A | * | 2/1997 | Schulman ..................... 370/252 |
| 7,487,229 | B2 | * | 2/2009 | Ohly ............................. 709/219 |
| 2003/0179780 | A1 | * | 9/2003 | Walker et al. ................ 370/508 |
| 2004/0066775 | A1 | * | 4/2004 | Grovenburg .................. 370/350 |
| 2005/0041692 | A1 | * | 2/2005 | Kallstenius .................. 370/503 |
| 2006/0007960 | A1 | * | 1/2006 | Liu et al. ...................... 370/503 |
| 2006/0059254 | A1 | * | 3/2006 | Widera et al. ................ 709/224 |
| 2006/0080575 | A1 | * | 4/2006 | Golparian ...................... 714/12 |
| 2006/0203853 | A1 | * | 9/2006 | Hwang ......................... 370/503 |
| 2007/0266119 | A1 | * | 11/2007 | Ohly ............................. 709/220 |

(Continued)

FOREIGN PATENT DOCUMENTS

WO    03 046766    6/2003

*Primary Examiner* — Alina N Boutah
(74) *Attorney, Agent, or Firm* — Oblon, Spivak, McClelland, Maier & Neustadt, L.L.P.

(57) ABSTRACT

A method of measuring temporal drift of an electronic apparatus linked to a network and capable of providing a time-stamp including capturing at least two messages including a gauge reference time circulating around the network, and determining precision of the time-stamping function of the apparatus as a function of the gauge reference time and of a time-stamp provided by the apparatus. The apparatus can be a network analyzer and each message captured includes at least one Ethernet frame including a gauge reference time in accordance with NTP (Network Time Protocol).

8 Claims, 2 Drawing Sheets

(56) References Cited

U.S. PATENT DOCUMENTS

2007/0269183 A1* 11/2007 Choi .............................. 386/84
2008/0247325 A1* 10/2008 Vaitaitis et al. ............... 370/252
2010/0189424 A1* 7/2010 Doehla et al. ................. 386/124
2010/0254318 A1* 10/2010 Lee et al. ...................... 370/328
2010/0280832 A1* 11/2010 Ojala et al. .................... 704/500

* cited by examiner

METHOD AND DEVICE FOR MEASURING THE TEMPORAL DRIFT OF AN ITEM OF ELECTRONIC EQUIPMENT CONNECTED TO A NETWORK

BACKGROUND (1) Field

This invention relates to a method and a device for measurement of the time deviation of an electronic equipment item connected to a network. It applies, in particular, to providing a measurement of the time deviation of the time-stamping system of network analyzers.

(2) Description of the Related Art

Time-stamping systems for network analyzers lack precision. As it happens, these time-stamping systems have the task of dating the network frames captured from the analyzed link. A problem that this invention is intended to resolve thus consists in evaluating the time deviation of the time-stamping function of a network analyzer in relation to a reference time.

Unlike a measurement equipment item such as a multimeter or an oscilloscope, network analyzers do not undergo periodic calibration because the metrology companies are not equipped, and the network analyzers are not designed, for that.

Until then the performances of the time-stamping function of network analyzers were not called into question. The inventors therefore saw a need for standardization of network analyzers.

BRIEF SUMMARY

To this end, according to a first aspect, this invention applies to a method for measurement of the time deviation of an electronic equipment item connected to a network and able to provide a time-stamping, characterized in that it comprises:
 a step of capturing at least two messages including a standard reference time circulating on the said network and
 a step of determining the precision of the time-stamping function of the equipment item according to the said standard reference time and a time-stamping provided by the said equipment item.

By virtue of these arrangements, the time deviation is measured without dismantling or specific defining of the equipment item, since a nominal and operational use is made of this equipment item. In addition, the implementation of the method that is the object of this invention makes it possible to achieve a level of precision for the standardization that is more or less high according to the need of the user. This invention also has the advantage of making it possible to standardize several equipment items simultaneously.

According to specific characteristics, the said equipment item is a network analyzer.

According to specific characteristics, during the capturing step, each captured message comprises an Ethernet frame circulating on the said network, which frame includes the standard reference time.

According to specific characteristics, each message including a standard reference time is in accordance with the NTP protocol (acronym for "Network Time Protocol" for network time protocol).

According to specific characteristics, during the capturing step, a plurality of messages including a standard reference time is captured over a period in excess of ten minutes.

Preferentially, this period is on the order of one hour. In fact, the longer the capture period is, the better the precision of the standardization.

According to specific characteristics, during the step of determining the precision of the time-stamping function of the equipment item, a time deviation is calculated by comparing the period elapsed between the dates of capture of at least two messages including a standard reference time provided by the time-stamping function of the equipment item with the difference in the standard reference times contained in these messages.

According to specific characteristics, the method that is the object of this invention, such as briefly explained above, comprises a step of generating the standard reference time from signals provided by a constellation of satellites equipped with atomic clocks.

These signals in fact originate from a precise time reference source.

According to specific characteristics, during the capturing step, the said equipment item applies a capture filter that lets in only the said messages including a standard reference time.

According to a second aspect, this invention applies to a device for measurement of the time deviation of an electronic equipment item connected to a network and able to provide a time-stamping, characterized in that it comprises:
 a means for capturing at least two messages including a standard reference time circulating on the said network and
 a means for determining the precision of the time-stamping function of the equipment item according to the said standard reference time and a time-stamping provided by the said equipment item.

According to specific characteristics, the said equipment item is a network analyzer.

According to specific characteristics, the capture means is adapted for capturing at least one Ethernet frame circulating on the said network, which frame includes the standard reference time.

According to specific characteristics, the capture means is adapted for capturing at least one message including a standard reference time in accordance with the NTP protocol (acronym for "Network Time Protocol" for network time protocol).

According to specific characteristics, the capture means is adapted for capturing a plurality of messages including a standard reference time over a period in excess of ten minutes.

According to specific characteristics, the means for determining the precision of the time-stamping function of the equipment item is adapted for calculating a time deviation by comparing the period elapsed between the dates of capture of at least two messages including a standard reference time provided by the time-stamping function of the equipment item with the difference in standard reference times contained in these messages.

According to specific characteristics, the capture means is adapted for applying a capture filter that lets in only the said messages including a standard reference time.

According to a third aspect, this invention applies to a computer program that can be loaded into a computer system, the said program containing instructions enabling the implementation of the measurement method such as briefly explained above.

According to a fourth aspect, this invention applies to a non-transitory computer readable medium for information items readable by a computer or a microprocessor, removable or otherwise, storing instructions of a computer program, characterized in that it enables the implementation of the measurement method, such as briefly explained above.

Since the advantages, purposes and characteristics of this measurement device, this computer program and this medium for information items are similar to those of the measurement method that is the object of this invention, such as briefly explained above, they are not repeated here.

BRIEF DESCRIPTION OF THE DRAWINGS

Other advantages, purposes and characteristics of this invention will become apparent from the description that is going to follow, presented with an explanatory but in no way limitative intent, with reference to the attached drawings, in which.

DETAILED DESCRIPTION

Figure 1:
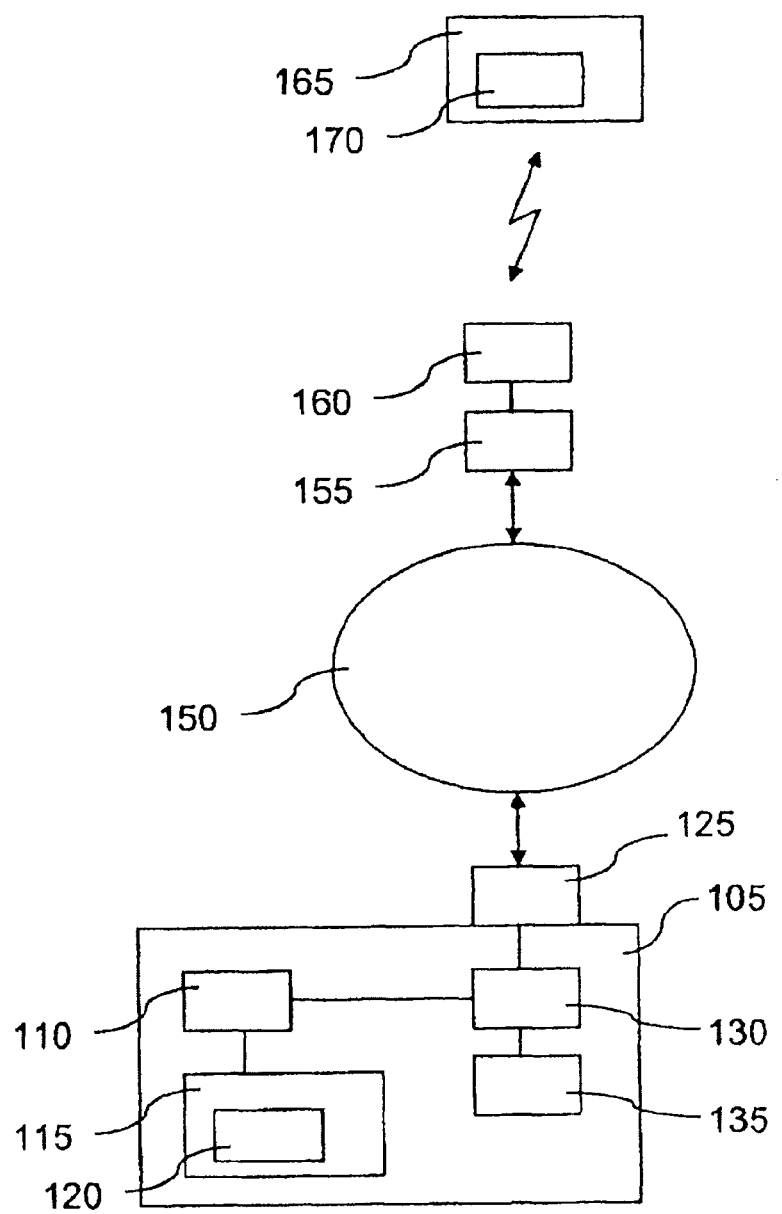
FIG. 1 schematically shows a specific embodiment of the device that is the object of this invention and a network conveying frames including a reference time.

As seen on FIG. 1, in a specific embodiment of the device that is the object of this invention, an equipment item consists of a network analyzer to be standardized 105 comprising a microcontroller 110 and a program memory 115 storing a program 120 implementing the method that is the object of this invention. Network analyzer 105 uses a port 125 for connection to a network 150, the said port being associated with a filter 130 and a time-stamping means 135, in a manner known in itself. In fact, network analyzer 105 is provided with the capacity to date with precision the network frames that it receives.

In this way, computer program 120 that is the object of this invention may be loaded into a computer system and contains instructions enabling the implementation of the measurement method such as briefly explained above. Program memory 115 may be a memory component, a memory integrated into microcontroller 110, a removable memory, for example a memory card or a CD-ROM. This medium stores the instructions of computer program 120.

Network 150 conveys Ethernet frames and is of NTP (acronym for "Network Time Protocol") type. It is connected to a reference time server 155, itself connected to a reception system 160 for signals sent out by satellites 165 provided with atomic clocks 170. In this way the NTP network uses a very precise time reference (for example originating from the constellation of "GPS" satellites, acronym for "Global Positioning System", the satellites of which are equipped with an atomic clock).

The implementation of the invention concerns three subsets:
the test environment, which is able to provide a precise time reference carried in messages in accordance with the NTP protocol;
the capture, during a test period, of specific messages comprising a control reference time; as explained below, the greater the test period is, the better the precision and
the calculation of the deviation by comparison of the dates of capture of the first and last messages comprising a reference time, during the test, with the reference times which these messages comprise.

Figure 2:
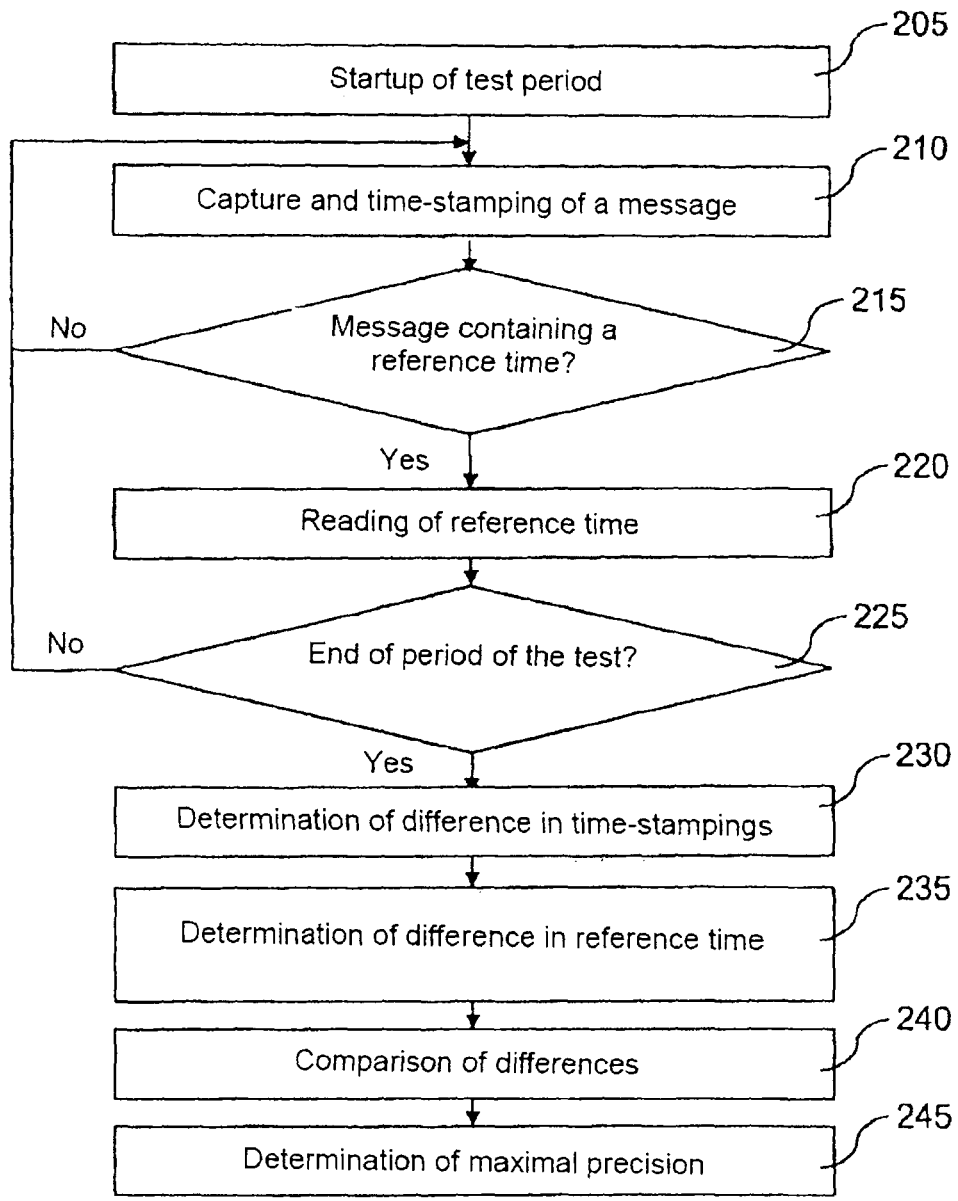
FIG. 2 shows, in the form of a logic diagram, steps implemented in a specific embodiment of the method that is the object of this invention.

As is seen on FIG. 2, in order to implement a specific embodiment of the method that is the object of this invention, a step 205 for startup of the period of the test is performed. During this step 205, the user, or a stored value, determines the period of the test, in excess of ten minutes and preferentially on the order of an hour. It is seen that the startup may be manual, that is to say performed by the user, or automatic, for example at a fixed daily time or at each time network analyzer 105 is turned on. During step 205, the equipment item to be standardized is connected and is configured to record the messages comprising an NTP reference time.

At the same time, during a step not shown, server 155 performs generation of the standard reference time from signals provided by a constellation of satellites equipped with atomic clocks. Server 155 sends out, on network 150, NTP frames comprising the standard reference time periodically, for example every 64 seconds.

Then, during a step 210, the capture and time-stamping of a message circulating on the network is performed, in a manner known in itself. During a step 215, it is determined whether this message comprises a reference time. If not, one returns to step 210. If the message comprises a reference time, a reading of the reference time is performed during a step 220.

Thus, to facilitate implementation of this invention, it is recommended to apply a capture filter, if the equipment item to be tested so permits, in order to capture only the NTP traffic. Preferentially, during step 215, the presence of NTP messages in the capture performed is verified regularly. It is noted that the sending period for these messages is dependent on the environment (it is, for example, 64 seconds).

Then, during a step 225, it is determined whether the period of the test is completed. If not, one returns to step 210. If the period of the test is completed, in step 230 the difference between the time-stampings of the first and the last messages received during the period of the test is determined. This time-stamping information also is called "timestamp" on numerous equipment items. The result $T_{analyzer}$ indicates the elapsed period measured by the equipment item.

$$T_{analyzer} = \text{Timestamp}_{last\ NTP\ message} - \text{Timestamp}_{first\ NTP\ message}.$$

During a step 235, the difference between the reference times of the first and last messages received during the period of the test is determined. In this way, the difference between the reference time indicated in the last NTP message captured during the test and the reference time indicated in the first NTP message captured during the test is calculated. The result indicates the elapsed reference period. It is noted that the reference time corresponds to the "Transmit Timestamp" field of the NTP message.

$$T_{reference} = \text{Transmit Timestamp}_{last\ NTP\ message} - \text{Transmit Timestamp}_{first\ NTP\ message}.$$

During a step 240, the difference between the differences measured during steps 230 to 235 is determined, in order to determine the time-stamping deviation of the equipment item in relation to the reference time. The time deviation of the equipment item during the period of the test thus is obtained by calculating the difference between the two periods obtained previously:

$$\text{Deviation}_{analyzer} = T_{reference} - T_{analyzer}.$$

For example, this deviation is given as an absolute value or, after division by the period of the test, as a relative value, for example as ppm (acronym for "part per million").

During a step 245, the maximal precision of the deviation measured during step 240 is determined. The maximal precision of the measurement is linked directly to the precision of the time reference ($P_{ref}$, without unity), the jitter (or "jitter") of the NTP network frames ($J_{ntp}$, seconds), the period of the test (T, seconds). This maximal precision ($P_{max}$, without unity) is given by the following formula:

$$P_{max} = P_{ref} + J_{NTP}/T$$

It is noted that, with setting up of NTP V4 synchronized on the time propagated by the GPS constellation, a precision of 1 ppm is achieved in 1 hour of testing.

As is understood upon reading the above description, the implementation of this invention has the advantage that it does not require any dismantling or specific defining of the equipment item since it is based on a nominal and operational use of the equipment item. In addition, this solution makes it possible to achieve a level of precision of the standardization that is more or less high according to the need of the user. This invention also makes it possible to standardize several equipment items simultaneously.

The invention claimed is:

1. A method for measurement of time deviation of an electronic equipment item connected to a network and configured to provide a time-stamping, comprising:

capturing, at the electronic equipment item, at least a first message including a first standard reference time circulating on the network and time-stamping when the at least first message is received at the electronic equipment item according to a first time observed by a time-stamping function of the electronic equipment item, and capturing, at the electronic equipment item, at least a second message including a second standard reference time circulating on the network and time-stamping when the at least second message is received at the electronic equipment item according to a second time observed by the time-stamping function of the electronic equipment item; and determining a deviation of the time-stamping function of the equipment item by comparing a first value with a second value, the first value being a period elapsed between the first time observed by the time-stamping function of the electronic equipment item and the second time observed by the time-stamping function of the electronic equipment item, and the second value being a difference in the first standard reference time included in the first message and the second standard reference time included in the second message.

2. A method according to claim 1, wherein, during the capturing, each captured message comprises an Ethernet frame circulating on the network, which frame includes the standard reference time.

3. A method according to claim 1, wherein each message including a standard reference time is in accordance with NTP (Network Time Protocol).

4. A method according to claim 1, wherein, during the capturing, a plurality of messages including a standard reference time are captured over a period in excess of ten minutes.

5. A method according to claim 1, further comprising generating the standard reference time from signals provided by a constellation of satellites equipped with atomic clocks.

6. A method according to claim 1, wherein, during the capturing, the equipment item applies a capture filter that lets in only messages including a standard reference time.

7. A non-transitory computer readable medium for information items readable by a computer or a microprocessor, removable or otherwise, storing computer executable instructions to be executed by a computer enabling implementation of the measurement method according to claim 1.

8. A device for measurement of time deviation of an electronic equipment item connected to a network and configured to provide a time-stamping, comprising:

a port configured to receive at least a first message including a first standard reference time circulating on the network at least a second message including a second standard reference time circulating on the network;

a time-stamping unit, implemented by a processor, that performs time-stamping when the first message is received at the electronic equipment item according to a first time observed by a time-stamping function of the electronic equipment item, and performs time-stamping when the second message is received at the electronic equipment item according to a second time observed by the time-stamping function of the electronic equipment item; and a determining unit, implemented by a processor, that determines a deviation of the time-stamping function of the equipment item by comparing a first value with a second value, the first value being a period elapsed between the first time observed by the time-stamping function of the electronic equipment item and the second time observed by the time-stamping function of the electronic equipment item, and the second value being a difference in the first standard reference time included in the first message and the second standard reference time included in the second message.

* * * * *